United States Patent
Nambara et al.

(10) Patent No.: US 10,394,023 B2
(45) Date of Patent: Aug. 27, 2019

(54) HEAD-UP DISPLAY DEVICE HAVING REFLECTING MIRROR WITH DIFFERENT P AND S POLARIZATION REFLECTANCES

(71) Applicant: DENSO CORPORATION, Kariya, Aichi-pref. (JP)

(72) Inventors: Takahiro Nambara, Kariya (JP); Jyunya Yokoe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/576,870

(22) PCT Filed: Jun. 7, 2016

(86) PCT No.: PCT/JP2016/002742
§ 371 (c)(1),
(2) Date: Nov. 27, 2017

(87) PCT Pub. No.: WO2016/203732
PCT Pub. Date: Dec. 22, 2016

(65) Prior Publication Data
US 2018/0164585 A1    Jun. 14, 2018

(30) Foreign Application Priority Data
Jun. 17, 2015 (JP) ................. 2015-122289

(51) Int. Cl.
*G02B 27/01* (2006.01)
*G02B 27/14* (2006.01)
(Continued)

(52) U.S. Cl.
CPC .......... *G02B 27/0101* (2013.01); *B60K 37/02* (2013.01); *G02B 27/141* (2013.01);
(Continued)

(58) Field of Classification Search
CPC ...... B60K 2350/2052; B60K 2350/352; B60K 37/02; G02B 2027/012; G02B 2027/0196;
(Continued)

(56) References Cited

U.S. PATENT DOCUMENTS 6,504,518 B1 * 1/2003 Kuwayama ............ G02B 27/01
340/980
7,320,534 B2 * 1/2008 Sugikawa ................ G02B 5/26
345/9

(Continued)

FOREIGN PATENT DOCUMENTS

JP    H02141720 A    5/1990
JP    H06144083 A    5/1994
(Continued)

*Primary Examiner* — Bao-Luan Q Le
(74) *Attorney, Agent, or Firm* — Harness, Dickey & Pierce, P.L.C.

(57) ABSTRACT

A head-up display device virtually displays an image to be viewable by an occupant by projecting the image on a projection member located above an instrument panel of a vehicle in a vehicle upward direction. Assuming that a direction along an up-down direction of the vehicle when the image is virtually displayed is defined as a vertical direction of the image, the head-up display device includes a projector that projects an image as light polarized in a polarization direction intersecting the vertical direction of the image and a reflecting mirror that reflects and redirects the light of the image from the projector toward the projection member, on an optical path between the projector and the projection member, and has a difference between S polarization reflectance and P polarization reflectance for the light from the projector.

14 Claims, 8 Drawing Sheets

(51) Int. Cl.
*G02B 27/18* (2006.01)
*G02B 27/28* (2006.01)
*B60K 37/02* (2006.01)

(52) U.S. Cl.
CPC .......... *G02B 27/18* (2013.01); *G02B 27/283* (2013.01); *B60K 2350/2052* (2013.01); *B60K 2350/352* (2013.01); *G02B 2027/012* (2013.01); *G02B 2027/0118* (2013.01); *G02B 2027/0121* (2013.01); *G02B 2027/0196* (2013.01)

(58) Field of Classification Search
CPC .. G02B 27/0101; G02B 27/141; G02B 27/18; G02B 27/283; G02B 2027/0118; G02B 2027/0121
See application file for complete search history.

(56) References Cited

U.S. PATENT DOCUMENTS

| | | | | |
|---|---|---|---|---|
| 8,876,294 | B2* | 11/2014 | Saisho | G02B 5/0278 353/11 |
| 9,423,615 | B2* | 8/2016 | Sato | G09G 3/3406 |
| 9,638,918 | B2* | 5/2017 | Uehara | G02B 27/0101 |
| 9,823,470 | B2* | 11/2017 | Ishikawa | B60K 35/00 |
| 2006/0018119 | A1* | 1/2006 | Sugikawa | G02B 5/26 362/231 |
| 2007/0217010 | A1* | 9/2007 | Lippey | G02B 27/0018 359/487.02 |
| 2013/0063754 | A1* | 3/2013 | Saisho | G02B 5/0257 358/1.13 |
| 2014/0177040 | A1* | 6/2014 | Uehara | G02B 27/0101 359/352 |
| 2015/0098029 | A1* | 4/2015 | Sato | G09G 3/3406 349/11 |
| 2016/0178901 | A1* | 6/2016 | Ishikawa | B60K 35/00 345/7 |
| 2017/0146803 | A1* | 5/2017 | Kishigami | G02B 5/30 |

FOREIGN PATENT DOCUMENTS

| | | |
|---|---|---|
| JP | 2004347633 A | 12/2004 |
| JP | 2006258884 A | 9/2006 |
| JP | 2008070782 A | 3/2008 |
| JP | 2011128500 A | 6/2011 |
| JP | 2013061554 A | 4/2013 |
| JP | 2014191321 A | 10/2014 |
| JP | 2015007763 A | 1/2015 |
| WO | WO-2016208133 A1 | 12/2016 |

* cited by examiner

HEAD-UP DISPLAY DEVICE HAVING REFLECTING MIRROR WITH DIFFERENT P AND S POLARIZATION REFLECTANCES

CROSS REFERENCE TO RELATED APPLICATIONS

This application is a U.S. National Phase Application under 35 U.S.C. 371 of International Application No. PCT/JP2016/002742 filed on Jun. 7, 2016 and published in Japanese as WO 2016/203732 A1 on Dec. 22, 2016. This application is based on and claims the benefit of priority from Japanese Patent Application No. 2015-122289 filed on Jun. 17, 2015. The entire disclosures of all of the above applications are incorporated herein by reference.

TECHNICAL FIELD

The present disclosure relates to a head-up display device (hereinafter abbreviated as an HUD device) that is to be mounted in a vehicle and to virtually display an image to be viewable by an occupant.

BACKGROUND ART

There has been known an HUD device that is mounted in a vehicle and virtually displays an image to be viewable by an occupant. An HUD device disclosed in Patent Literature 1 projects an image on a projection member located above an instrument panel in a vehicle. The HUD device includes a projector that projects an image as light polarized in a predetermined polarization direction and a reflecting mirror that reflects and redirects the light of the image from the projector toward the projection member, on an optical path between the projector and the projection member.

The reflecting mirror is formed by adhering a polarizing film to one surface of a light-transmissive plate-shaped substrate. A reflection axis thereof is set in accordance with the polarization axis of the projector, that is, so as to form an angle of 45° with respect to the horizontal direction of the image. Thus, part of external light such as sunlight that enters the reflecting mirror is cut.

PRIOR ART LITERATURE

Patent Literature

Patent Literature 1: JP 2014-191321 A

SUMMARY OF INVENTION

The present inventors have further intensively studied the properties of the external light, and have found that the external light that is transmitted through the projection member and enters the HUD device easily becomes partially polarized light along a direction corresponding to the vertical direction of the image when the external light is transmitted through the projection member. That is, the present inventors have found the possibility of, by configuring the HUD device in consideration of the partially polarized light, efficiently cutting the external light and thereby suppressing temperature rise of the projector.

It is an object of the present disclosure to provide an HUD device that can suppress temperature rise of a projector.

According to an aspect of the present disclosure, a head-up display device is to be mounted in an instrument panel of a vehicle and to virtually display an image to be viewable by an occupant by projecting the image on a projection member located above the instrument panel in a vehicle upward direction. Assuming that a direction along an up-down direction of the vehicle when the image is virtually displayed is defined as a vertical direction of the image, the head-up display device includes a projector that projects an image as light polarized in a polarization direction intersecting the vertical direction of the image and a reflecting mirror that is disposed on an optical path between the projector and the projection member to reflects and redirects the light of the image from the projector toward the projection member, and has a difference between S polarization reflectance and P polarization reflectance for the light from the projector.

According to the above configuration, the light of the image from the projector enters the reflecting mirror on the optical path between the projector and the projection member, and the external light transmitted through the projection member can enter the HUD device. For example, in the case where the external light is the partially polarized light along the direction corresponding to the vertical direction of the image, the external light and the light of the image polarized in the polarization direction intersecting the vertical direction of the image are polarized in different directions. Since the reflecting mirror has the difference between the S polarization reflectance and the P polarization reflectance, it is possible to reduce the reflectance of the external light toward the projector while improving the reflectance of the light of the image toward the projection member, in accordance with the redirected direction of the reflecting mirror. Thus, by efficiently cutting the external light, it is possible to provide the HUD device that suppresses the temperature rise of the projector.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, various embodiments of the present disclosure will be described with reference to the accompanying drawings. In the following embodiments, corresponding components are denoted by the same reference numerals, and redundant description may be omitted. In each embodiment, when only a part of a configuration is described, another embodiment previously described can be employed for other parts of the configuration. Further, it is possible to not only combine configurations as specified in the description of the embodiments but also partially combine configurations of embodiments even though not specified herein as long as the combination poses no problem.

First Embodiment

Figure 1:
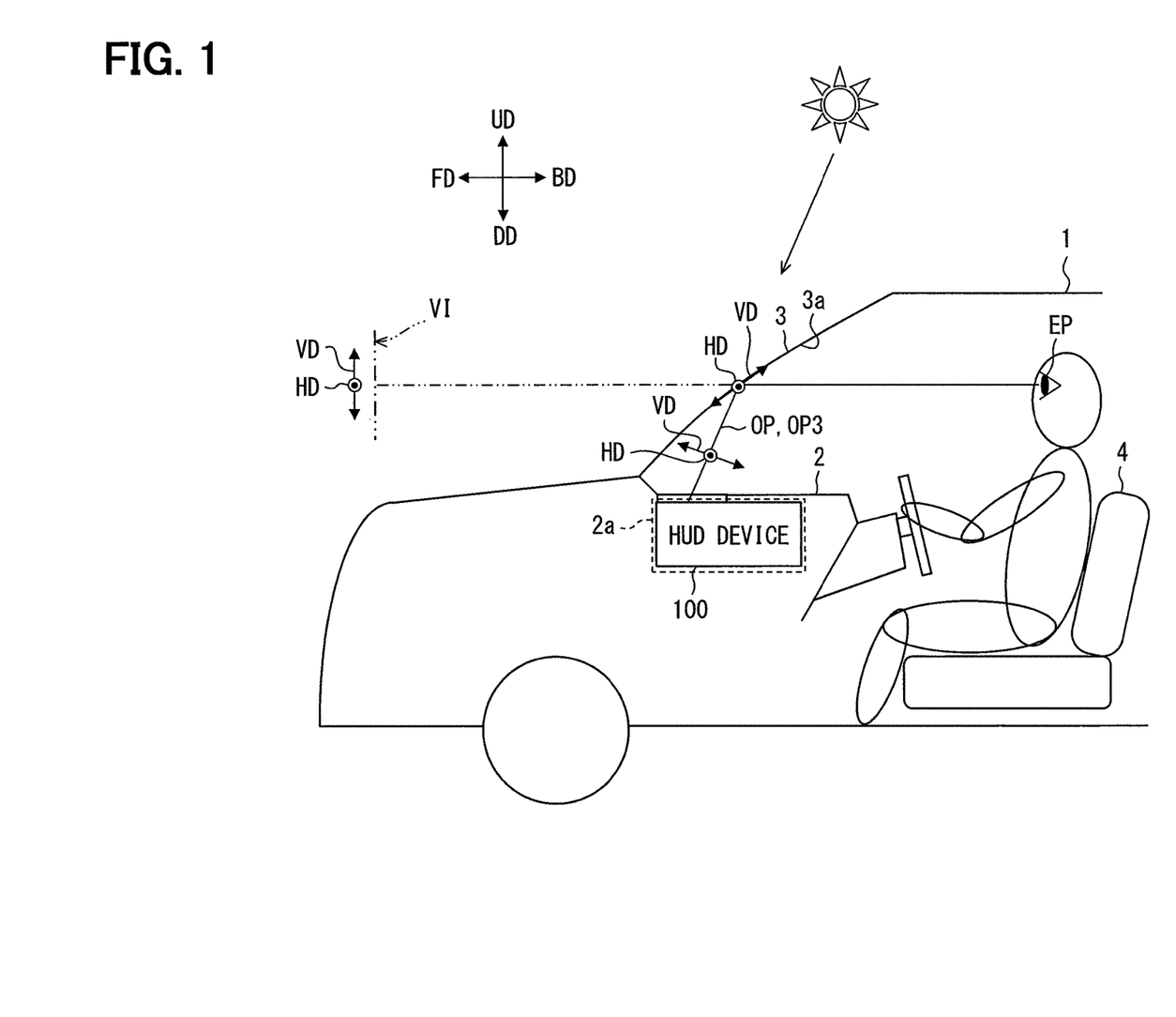
FIG. 1 is a schematic view showing a mounting state of an HUD device according to a first embodiment to a vehicle.

As shown in FIG. 1, an HUD device 100 according to a first embodiment of the present disclosure is mounted in a vehicle 1, and housed in a housing space 2a in an instrument panel 2. The HUD device 100 projects an image on a windshield 3 as a projection member of the vehicle 1. The light of the image is reflected by the windshield 3, so that the HUD device 100 virtually displays image to be viewable by an occupant of the vehicle 1. That is, the light of the image reflected by the windshield 3 reaches an eye point EP of the occupant inside the vehicle 1, and the occupant perceives the light of the image as a virtual image VI. Accordingly, the occupant can recognize various kinds of information through the virtual image VI. The various kinds of information virtually displayed as the image include, for example, vehicle state values such as a vehicle speed and a fuel remaining amount, or navigation information such as road information and vision auxiliary information.

The windshield 3 of the vehicle 1 is located above the instrument panel 2 in a vehicle upward direction, and formed into a light-transmissive plate made of glass, synthetic resin, or the like. The windshield 3 is disposed inclined toward a vehicle backward direction BD as going in the vehicle upward direction UD. An interior surface of the windshield 3 includes a projection surface 3a to which the image is projected, and the projection surface 3a has a concave shape or a flat plane shape. Thus, the occupant who sits on a seat 4 of the vehicle 1 and faces in a vehicle frontward direction FD visually recognizes the foreground including roads and road signs through the windshield 3, and can also visually recognize the virtual display of the image.

In the first embodiment, a dimension in a vehicle left-right direction of the housing space 2a in the instrument panel 2 is larger than a dimension in a vehicle up-down direction of the housing space 2a. Therefore, the optical system of the HUD device 100 is designed in accordance with the housing space 2a.

In the present embodiment, a vehicle downward direction DD refers to a direction in which gravity acts when the vehicle 1 travels or stops on a flatland. The vehicle upward direction UD refers to a direction opposite to the vehicle downward direction DD. The vehicle frontward direction FD refers to the direction of the front toward which the occupant sitting on the seat 4 faces. The vehicle backward direction BD refers to a direction opposite to the vehicle frontward direction FD. A vehicle leftward direction LD refers to a left direction with respect to the occupant facing toward the vehicle frontward direction FD. A vehicle rightward direction RD refers to a right direction with respect to the occupant facing toward the vehicle frontward direction FD. Further, the vehicle up-down direction refers to the vehicle upward direction UD and the vehicle downward direction DD. A vehicle front-back direction refers to the vehicle frontward direction FD and the vehicle backward direction BD. The vehicle left-right direction refers to the vehicle leftward direction LD and the vehicle rightward direction RD.

Further, a direction along the vehicle up-down direction when the image is virtually displayed is defined as a vertical direction VD of the image, and a direction along the vehicle left-right direction when the image is virtually displayed is defined as a horizontal direction HD of the image.

Figure 2:
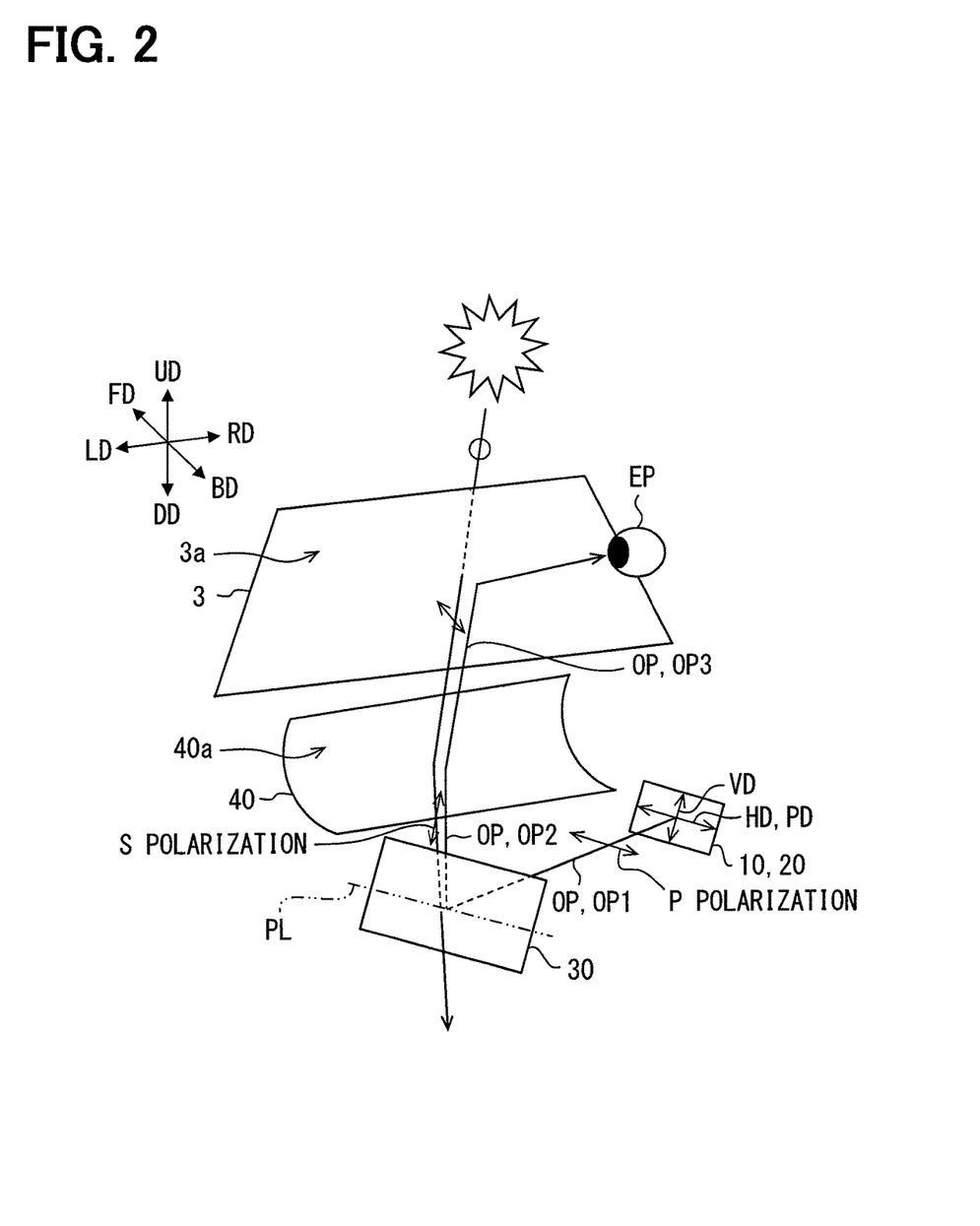
FIG. 2 is a schematic view showing an optical path of the HUD device according to the first embodiment.

Hereinafter, the specific configuration of the HUD device 100 will be described with reference to FIGS. 2 to 5. As shown in FIG. 2, the HUD device 100 includes a projector 10, a secondary mirror 30, and a concave mirror 40, which are housed in a housing having a shape corresponding to the housing space 2a.

Figure 3:
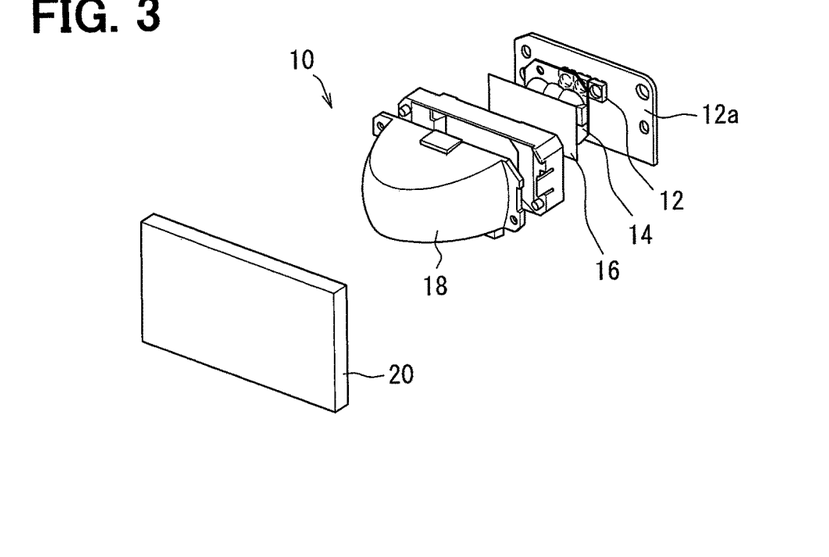
FIG. 3 is a perspective view showing the configuration of a projector according to the first embodiment.

As shown in FIG. 3, the projector 10 includes a light source 12, a condenser lens 14, a diffusion plate 16, a projection lens 18, and a liquid crystal panel 20, which are housed, for example, in a box-shaped projector case.

The light source 12 is composed of, e.g., a plurality of light emitting diode elements, and disposed on a circuit board 12a for the light source. The light source 12 is electrically connected to a power supply through a wiring pattern on the circuit board 12a for the light source. The light source 12 emits light-source light with an emission amount according to a current amount by energization. The light source 12 thereby projects the light-source light toward the condenser lens 14. More specifically, in the light source 12, pseudo white light is achieved by covering a blue light emitting diode with a fluorescent substance.

The condenser lens 14 is a light-transmissive convex lens made of synthetic resin, glass, or the like, and is disposed between the light source 12 and the diffusion plate 16. The condenser lens 14 condenses the light-source light from the light source 12 and emits the light toward the diffusion plate 16.

The diffusion plate 16 is a plate formed of synthetic resin, glass, or the like, and is disposed between the condenser lens 14 and the projection lens 18. The diffusion plate 16 emits, toward the projection lens 18, the light-source light whose brightness uniformity has been adjusted by diffusion.

The projection lens 18 is a light-transmissive convex lens made of synthetic resin, glass, or the like, and is disposed between the diffusion plate 16 and the liquid crystal panel 20. The projection lens 18 condenses the light source light from the diffusion plate 16 and projects the light toward the liquid crystal panel 20.

The liquid crystal panel 20 is a liquid crystal panel using e.g. thin film transistors (TFTs), and is an active matrix type liquid crystal panel formed of a plurality of liquid crystal pixels arranged in two-dimensional directions of the vertical direction VD and horizontal direction HD of the image. In the liquid crystal panel 20, a pair of polarizing plates, a liquid crystal layer sandwiched between the pair of polarizing plates, and the like are stacked. The polarizing plate has a property of transmitting light having an electric field vector in a predetermined direction and shielding light having an electric field vector in a direction substantially perpendicular to the predetermined direction, and the pair of polarizing plates are arranged so that the respective predetermined directions are substantially orthogonal to each other. By voltage application to each liquid crystal pixel, the liquid crystal layer can rotate the polarization direction of light entering the liquid crystal layer in accordance with the applied voltage.

Therefore, the liquid crystal panel 20 controls the transmittance of light source light for each liquid crystal pixel, so the projector 10 can project an image. The image projected from the projector 10 is projected as light polarized in a polarization direction PD intersecting the vertical direction VD of the image by disposing the polarizing plate. The polarization direction PD is a direction that forms an angle of 45° or more with respect to the vertical direction VD of the image, and particularly in the present embodiment, is a direction that is substantially parallel to the horizontal direction HD of the image. The liquid crystal panel 20 according to the present embodiment is formed in a rectangular shape, and is a horizontally long panel having a dimension in the horizontal direction HD of the image larger than a dimension in the vertical direction VD.

Figure 4:
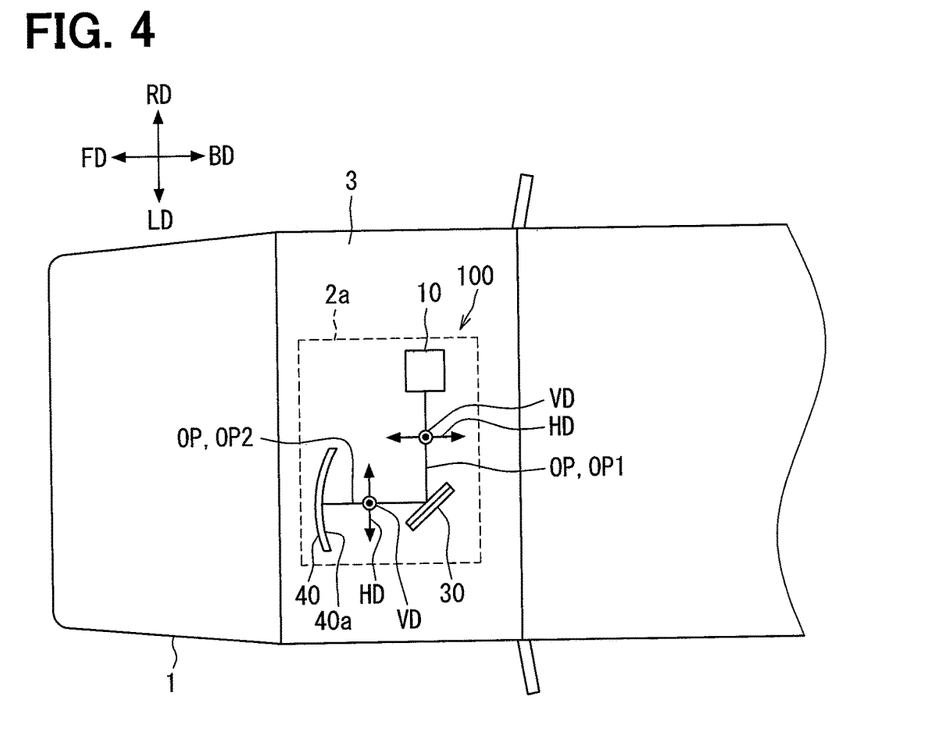
FIG. 4 is a schematic view of the optical path of FIG. 2 as viewed from a vehicle upper side to a vehicle lower side.

By the light of the image from the projector 10, an optical path OP through the secondary mirror 30, the concave mirror 40, and the windshield 3 is formed, as shown in FIGS. 2 and 4. More specifically, in the first embodiment, an optical path OP1 from the projector 10 to the secondary mirror 30 is formed in the vehicle left-right direction, an optical path OP2 from the secondary mirror 30 to the concave mirror 40 is formed in the vehicle front-back direction, and an optical path OP3 from the concave mirror 40 to the windshield 3 is formed in the vehicle up-down direction.

Figure 5:
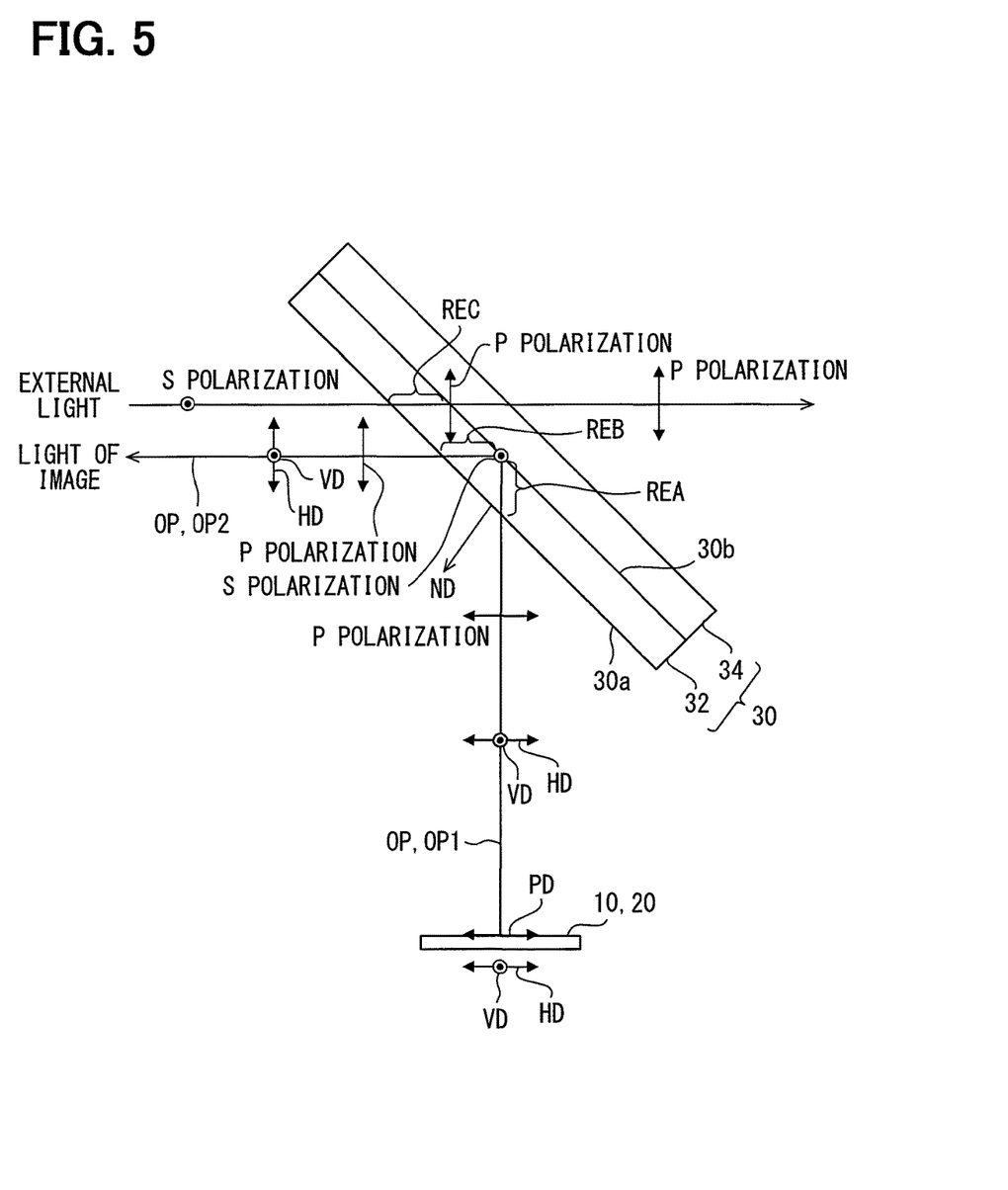
FIG. 5 is a schematic enlarged view of a secondary mirror according to the first embodiment.

As shown in detail in FIG. 5, the secondary mirror 30 disposed on the optical path OP includes a retardation plate 32 and a dielectric multilayer film 34, which are piled together and formed into a flat plate. The retardation plate 32 is a phase shifter formed like a plate made of e.g. sapphire glass or polycarbonate resin. The retardation plate 32 is disposed on the front side of the secondary mirror 30, that is, the incident/reflection side of the light of the image.

The dielectric multilayer film 34 is disposed on the back side from the retardation plate 32, and formed by stacking thin films made of two or more types of dielectrics having different refractive indexes in a normal direction ND of a front surface 30a. The dielectric multilayer film according to the present embodiment is a multilayer film of ten layers including a dielectric film made of, e.g., silicon dioxide ($SiO_2$) or titanium dioxide ($TiO_2$).

The film thickness of each dielectric film is appropriately set, e.g., by computer calculation in order to obtain a reflection characteristic in which infrared light reflectance is lower than visible light reflectance. It is not necessary that the reflection characteristic holds for infrared light and visible light of all wavelengths, and it is sufficient if the average value of reflectances of wavelengths of infrared light is lower than the average value of reflectances of wavelengths of visible light.

The secondary mirror 30 is formed by depositing the dielectric multilayer film on the surface of the retardation plate 32.

The secondary mirror 30 is a reflecting mirror that reflects and redirects the light of the image from the projector 10 to the concave mirror 40 adjacent to the windshield 3. By the secondary mirror 30 according to the first embodiment, the light of the image is redirected in the horizontal direction HD of the image.

As for a method for determining the redirection, the vertical direction VD and the horizontal direction HD of the image at the time of virtually displaying the image or the vertical direction VD and the horizontal direction HD of the image in the liquid crystal panel 20 of the projector 10 are projected onto the secondary mirror 30 along the optical path OP, as vectors. These vectors projected on the front surface 30a of the secondary mirror 30 are compared with a redirection projection line PL (see FIG. 2) obtained by orthogonally projecting, on the front surface 30a, the optical path OP of incident light on the secondary mirror 30 and reflected light. That is, if the virtual redirection projection line PL is closer to the direction of the vector obtained by projecting the horizontal direction HD than the vector obtained by projecting the vertical direction VD, it can be said that the secondary mirror 30 redirects the light of the image in the horizontal direction HD of the image.

The retardation plate 32 is set so as to generate a phase difference of ½ wavelength in one way with respect to the obliquely incident (e.g., an incident angle of 45°) and reflected light of the image. The fast axis direction of the retardation plate 32 is set in an oblique direction with respect to the vertical direction VD and the horizontal direction HD of the incident image, for example, at an angle of 45° with respect to the vertical direction VD and the horizontal direction HD of the image. With this configuration, the secondary mirror has the difference between the S polarization reflectance and the P polarization reflectance for the light of the image, and the P polarization reflectance is higher than the S polarization reflectance. Particularly, in the present embodiment, the difference between the S polarization reflectance and the P polarization reflectance is 5% or more.

As shown in FIGS. 2 and 4, the concave mirror 40 disposed on the optical path OP is formed by depositing aluminum as a reflecting surface 40a on the surface of a substrate made of synthetic resin, glass, or the like. The reflecting surface 40a is formed like a smooth curved surface as a concave surface with the center of the concave mirror 40 concaved. The concave mirror 40 reflects and redirects the light of the image from the secondary mirror 30 to the windshield 3 in the vertical direction VD of the image.

The light of the image projected from the projector 10 will be described in more detail. As shown in FIGS. 4 and 5, the light of the image from the projector 10 obliquely enters the retardation plate 32 of the secondary mirror 30, as the light of P polarization. The light of the image transmitted through the retardation plate 32 reaches an interface 30b with the dielectric multilayer film 34 by an action REA of the retardation plate 32, and is converted into S polarized light. The S polarization reflectance of the dielectric multilayer film 34 is higher than the P polarization reflectance; therefore, the light of the image is reflected with high reflectance. The light of the image reflected by the dielectric multilayer film 34 is again transmitted through the retardation plate 32, and is converted by an action REB of the retardation plate 32 into P polarized light, which travels toward the concave mirror 40.

On the other hand, there are cases where external light such as sunlight enters the HUD device 100, as shown in FIGS. 1 and 2. More specifically, the external light transmitted through the windshield 3 from e.g. the vehicle upper side becomes partially polarized light including a lot of P polarization components of the windshield 3 because the S polarization reflectance of the windshield 3 is higher than the P polarization reflectance. In other words with respect to the image projected from within the instrument panel 2 to the vehicle upper side above the instrument panel 2, the external light becomes partially polarized light along a direction corresponding to the vertical direction VD of the image, and travels opposite to the optical path OP3. For example, in the case where the external light is sunlight, although an incident direction to the windshield 3 varies in accordance with situations such as the direction of the vehicle 1 and a time, the external light entering the HUD device 100 becomes such partially polarized light even if there is a slight direction error.

Accordingly, as shown in FIG. 5, the external light reflected by the concave mirror 40 obliquely enters the retardation plate 32 of the secondary mirror 30, in the state of having a lot of S polarization components to the secondary mirror 30. The external light transmitted through the retardation plate 32 reaches the interface 30b with the dielectric multilayer film 34 by an action REC of the retardation plate 32, and becomes the state of having a lot of P polarization components. Since the S polarization reflectance of the dielectric multilayer film 34 is higher than the P polarization reflectance, the external light is transmitted with high transmittance. Thus, much of the external light is separated from the optical path OP.

In FIGS. 2 and 5, the polarization state of the light of the image and the polarization state of the external light are schematically indicated by arrows. However, the partial polarization of the external light is not shown in the figures, but large-component directions are indicated instead.

Operational Effect

Hereinafter, operational effects of the above-described first embodiment will be described.

According to the first embodiment, the light of the image from the projector 10 enters the secondary mirror 30 as the reflecting mirror on the optical path OP between the projector 10 and the windshield 3 as the projection member, and the external light transmitted through the windshield 3 can enter the HUD device 100. For example, in the case where the external light is the partially polarized light along the direction corresponding to the vertical direction VD of the image, the external light and the light of the image polarized in the polarization direction PD intersecting the vertical direction VD of the image are polarized in different directions. Since the secondary mirror 30 has the difference between the S polarization reflectance and the P polarization reflectance, it is possible to reduce the reflectance of the external light toward the projector 10 while improving the reflectance of the light of the image toward the windshield 3, in accordance with the redirected direction of the secondary mirror 30. Thus, it is possible to provide the HUD device 100 that suppresses temperature rise of the projector 10 by efficiently cutting the external light.

Further, according to the first embodiment, the secondary mirror 30 redirects the light of the image in the horizontal direction HD of the image, and the P polarization reflectance is higher than the S polarization reflectance. Thus, it is possible to surely reduce the reflectance of the external light which easily becomes the partially polarized light along the direction corresponding to the vertical direction VD of the image toward the projector 10 while improving the reflectance of the light of the image polarized in the polarization direction PD intersecting the vertical direction VD of the image toward the windshield 3.

Further, according to the first embodiment, the secondary mirror 30 includes the retardation plate 32 disposed on the front side of the secondary mirror 30 and the dielectric multilayer film 34 disposed on the back side from the retardation plate 32. In the secondary mirror 30, since the retardation plate 32 allows incident light to enter the dielectric multilayer film 34 while changing the polarization of the incident light, it is possible to control the reflectance of the dielectric multilayer film 34. Therefore, the P polarization reflectance can be easily higher than the S polarization reflectance, and it is possible to efficiently cut the external light.

Further, according to the first embodiment, the dielectric multilayer film 34 has the reflection characteristic in which the infrared light reflectance is lower than the visible light reflectance. This dielectric multilayer film suppresses the reflection of the infrared light of the external light causing heat generation toward the projector 10 while reflecting the light of the image as the visible light with high reflectance toward the windshield 3. Therefore, it is possible to suppress the temperature rise of the projector 10.

Further, according to the first embodiment, the difference between the S polarization reflectance and the P polarization reflectance is 5% or more. Thus, it is possible to surely reduce the reflectance of the external light toward the projector 10 while improving the reflectance of the light of the image toward the windshield 3.

Further, according to the first embodiment, the polarization direction PD is a direction that forms an angle of 45° or more with respect to the vertical direction VD of the image. Thus, the external light and the light of the image are polarized surely in different directions; therefore, it is possible to reduce the reflectance of the external light toward the projector 10 while improving the reflectance of the light of the image toward the windshield 3.

Second Embodiment

Figure 6:
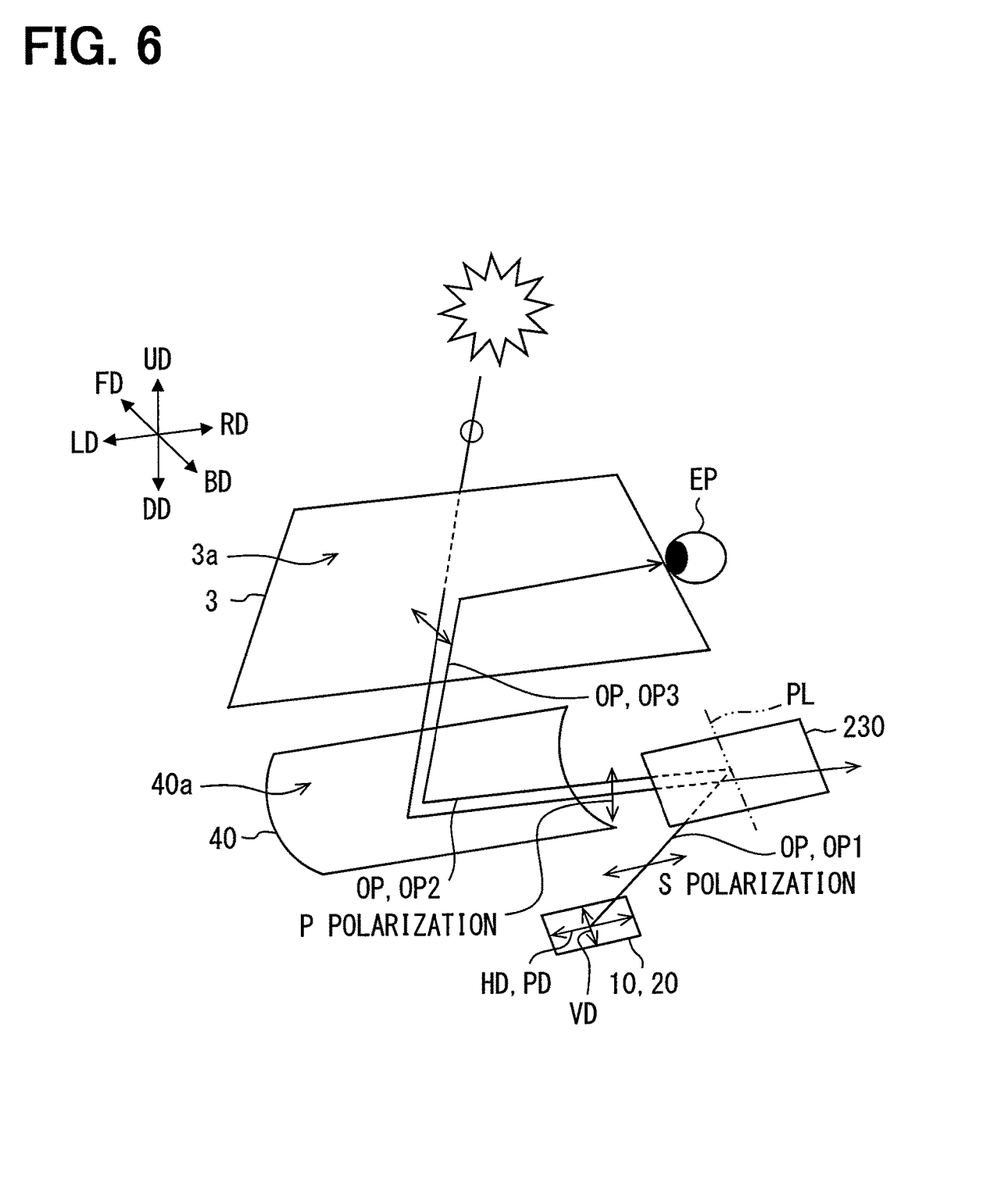
FIG. 6 is a schematic view showing an optical path of an HUD device according to a second embodiment.
Figure 7:
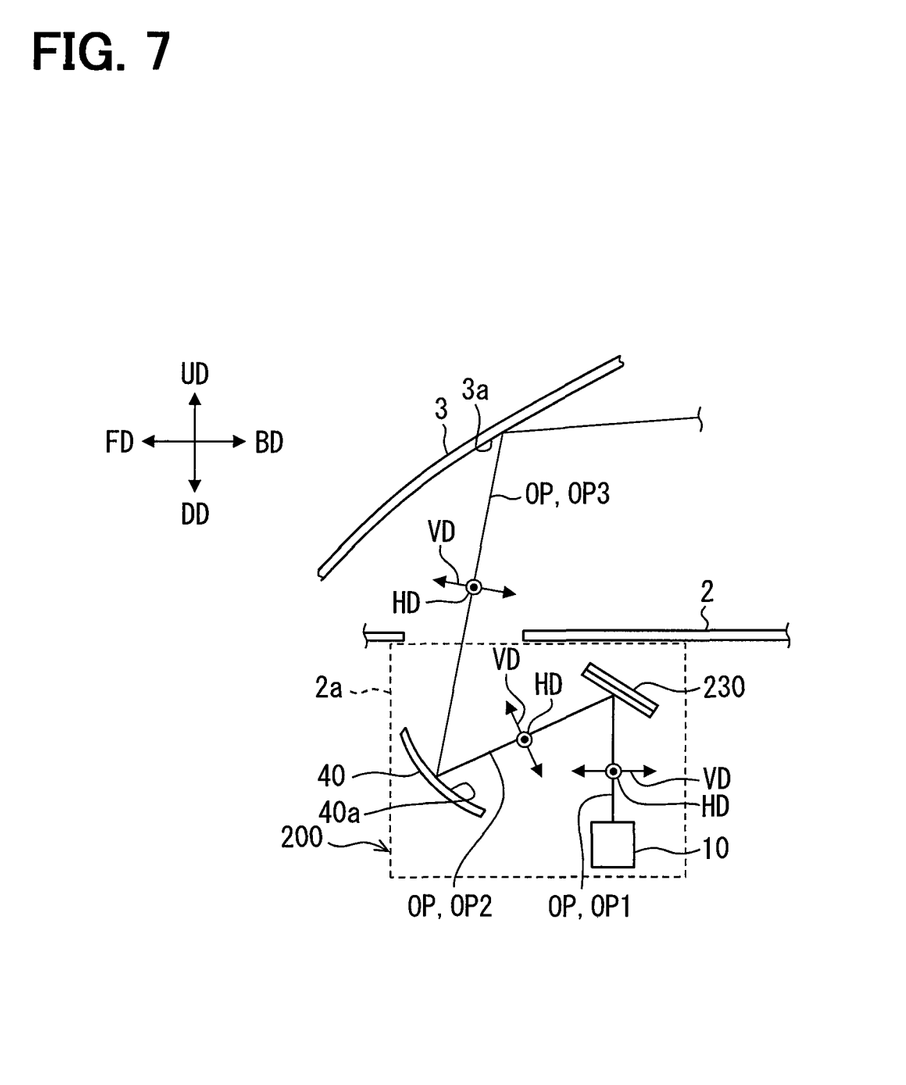
FIG. 7 is a schematic view of the optical path of FIG. 6 as viewed from a vehicle left side to a vehicle right side.
Figure 8:
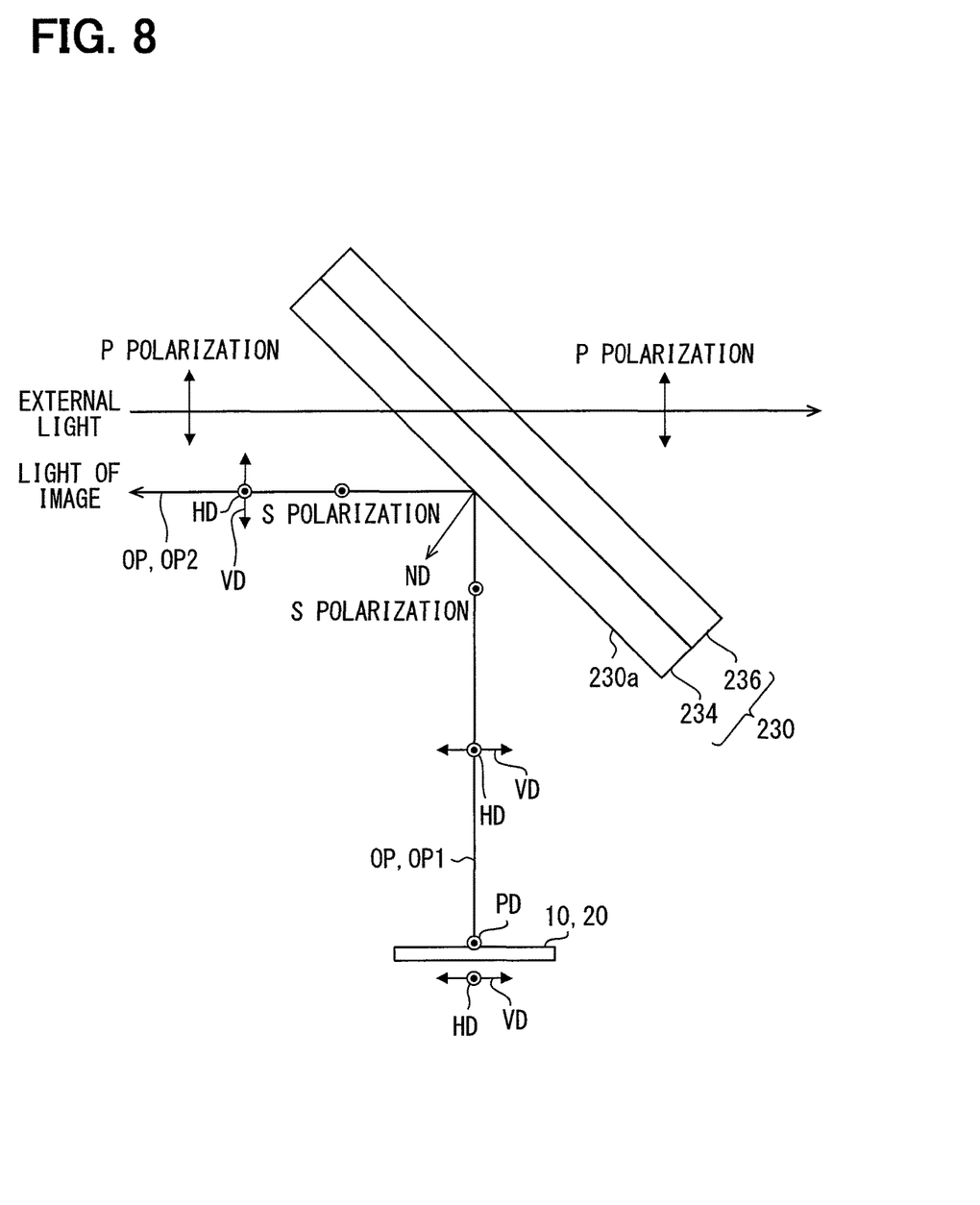
FIG. 8 is a schematic enlarged view of a secondary mirror according to the second embodiment.

As shown in FIGS. 6 to 8, a second embodiment of the present disclosure is a modification of the first embodiment. The differences of the second embodiment from the first embodiment will be mainly described.

As shown in FIGS. 6 and 7, an HUD device 200 according to the second embodiment is housed in a housing space 2a in the instrument panel 2 of the vehicle 1, as in the first embodiment. In the second embodiment, a dimension in the vehicle up-down direction of the housing space 2a is larger than a dimension in the vehicle left-right direction of the housing space 202a. Therefore, the optical system of the HUD device 200 is designed in accordance with the housing space 2a.

By the light of the image from the projector 10, an optical path OP through a secondary mirror 230, the concave mirror 40, and the windshield 3 is formed. More specifically, in the second embodiment, an optical path OP1 from the projector 10 to the secondary mirror 230 is formed in the vehicle up-down direction, and an optical path OP2 from the secondary mirror 230 to the concave mirror 40 is formed in the vehicle front-back direction. Further, as in the first embodiment, the optical path OP3 from the concave mirror 40 to the windshield 3 is formed in the vehicle up-down direction.

As shown in detail in FIG. 8, the secondary mirror 230 according to the second embodiment includes a light-transmissive plate 236 and a dielectric multilayer film 234, which are piled together and formed into a flat plate. The dielectric multilayer film 234 is disposed on the front side of the secondary mirror 230, that is, the incident side of the light of the image from the projector 10. The other configuration of the dielectric multilayer film 234 is the same as the dielectric multilayer film 34 according to the first embodiment, and therefore will not be described.

The light-transmissive plate 236 is disposed on the back side from the dielectric multilayer film 234, and formed like a flat plate made of synthetic resin, glass, or the like. The secondary mirror is formed by depositing the dielectric multilayer film 234 on the surface of the light-transmissive plate 236.

By the dielectric multilayer film 234, the secondary mirror 230 has the difference between the S polarization reflectance and the P polarization reflectance for the light of the image, and the S polarization reflectance is higher than the P polarization reflectance. Particularly, in the present embodiment, the difference between the S polarization reflectance and the P polarization reflectance is 5% or more. The secondary mirror 230 is a reflecting mirror that reflects and redirects the light of the image from the projector 10 to the concave mirror 40 adjacent to the windshield 3. By the secondary mirror 230 according to the second embodiment, the light of the image is redirected in the vertical direction VD of the image.

The light of the image projected from the projector 10 will be described in more detail. The light of the image from the projector 10 obliquely enters the dielectric multilayer film 234 of the secondary mirror 230, as the light of S polarization. The S polarization reflectance of the dielectric multilayer film 234 of the secondary mirror 230 is higher than the P polarization reflectance; therefore, the light of the image is reflected with high reflectance, and travels toward the concave mirror 40.

On the other hand, when external light such as sunlight enters the HUD device 200 and is reflected by the concave mirror 40, the external light obliquely enters the dielectric multilayer film 234 of the secondary mirror 230, in the state of having a lot of P polarization components to the secondary mirror 230. Since the S polarization reflectance of the dielectric multilayer film 234 of the secondary mirror 230 is higher than the P polarization reflectance, the external light is transmitted through the dielectric multilayer film 234 with high transmittance, and further transmitted through the light-transmissive plate 236. Thus, much of the external light is separated from the optical path OP.

According to the second embodiment, the secondary mirror 230 as the reflecting mirror redirects the light of the image in the vertical direction VD of the image, and the S polarization reflectance is higher than the P polarization reflectance. Therefore, it is possible to surely reduce the reflectance of the external light which easily becomes the partially polarized light along the direction corresponding to the vertical direction VD of the image toward the projector 10 while improving the reflectance of the light of the image polarized in the polarization direction PD intersecting the vertical direction VD of the image toward the windshield 3.

Further, according to the second embodiment, the secondary mirror 230 includes the dielectric multilayer film 234 formed by stacking dielectrics in a normal direction ND of a front side surface 230a. Since the dielectrics are stacked in the normal direction ND of the front side surface 230a, even if the secondary mirror 230 is installed by being rotated around the normal direction ND as the axis during manufacturing for example, since the state where the S polarization reflectance is higher than the P polarization reflectance is maintained, it is possible to efficiently cut the external light. Therefore, since it is not necessary to consider the rotation tolerance of the secondary mirror 230 during manufacturing, it is possible to easily provide the HUD device 200 that suppresses the temperature rise of the projector 10.

Third Embodiment

Figure 9:
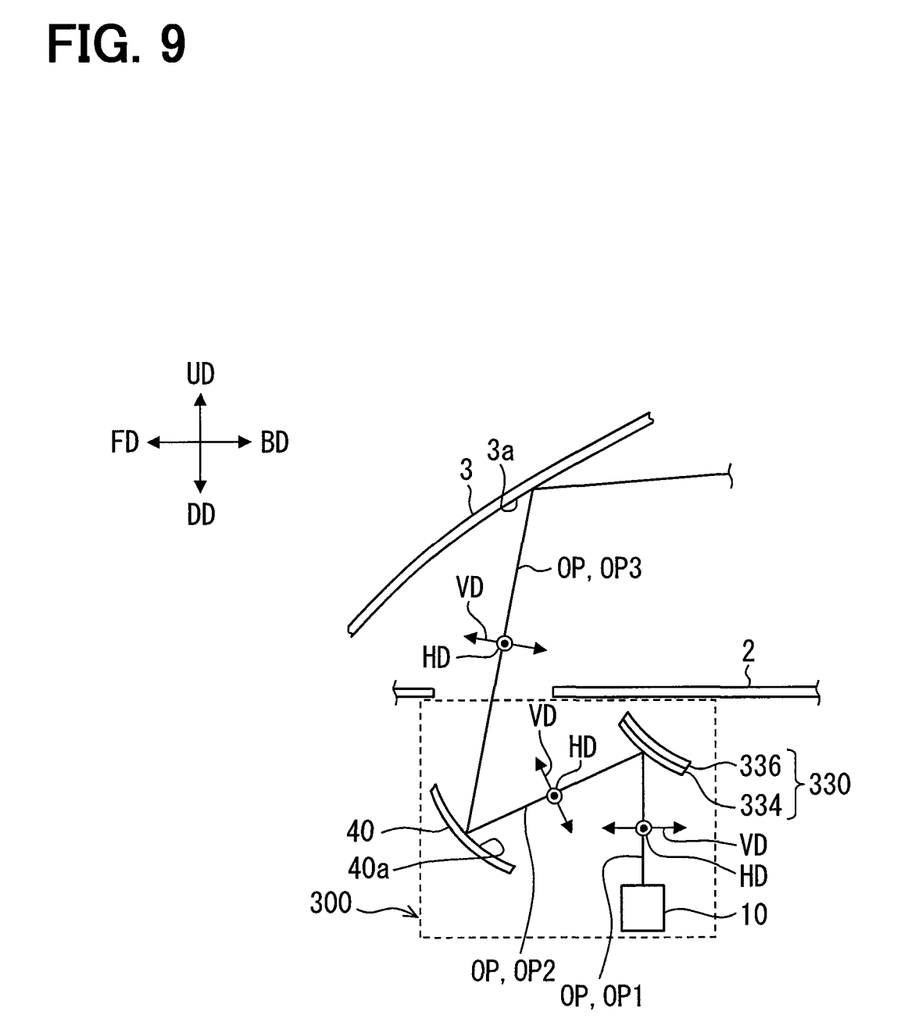
FIG. 9 is a view corresponding to FIG. 7, according to a third embodiment.

As shown in FIG. 9, a third embodiment of the present disclosure is a modification of the second embodiment. The differences of the third embodiment from the first embodiment will be mainly described.

A secondary mirror 330 of an HUD device 300 according to the third embodiment includes a light-transmissive plate 336 and a dielectric multilayer film 334 as in the second embodiment, but is formed like a convex mirror, unlike the second embodiment.

More specifically, the light-transmissive plate 336 is formed like a curved plate, with the center of the front side convexed, and the secondary mirror 330 is formed by depositing the dielectric multilayer film 334 on the front side. The dielectric multilayer film 334 is the same as the dielectric multilayer film 34 according to the first embodiment, except for being stacked in accordance with the curved surface, and therefore will not be described.

According to the third embodiment, the secondary mirror 330 as the reflecting mirror is formed like the convex mirror. According to the secondary mirror 330, even if part of the external light is reflected by the secondary mirror 330, the external light spreads in other directions; therefore, it is possible to further suppress the rate of arrival at the projector 10 and suppress the temperature rise of the projector 10.

Other Embodiments

The embodiments of the present disclosure have been described hereinabove. However, the present embodiment will not be limited to the embodiments described hereinabove, but various embodiments and combinations thereof will be applicable within the gist of the present disclosure.

More specifically, as a first modification, an optical element such as a lens or a mirror may be additionally disposed on the optical path OP.

As a second modification, as the projection member, instead of the windshield 3, a combiner separate from the vehicle may be installed in the vehicle, and the image may be projected on the combiner.

As a third modification relating to the first embodiment, the secondary mirror 30 may include a light-transmissive plate disposed on the back side from the dielectric multilayer film 34 in order to ensure the strength, for example.

As a fourth modification relating to the second embodiment, the concave mirror 40 which reflects and redirects the light of the image from the projector 10 toward the windshield 3 in the vertical direction VD of the image may be a reflecting mirror having the S polarization reflectance higher than the P polarization reflectance. In this case, it is not necessary to provide the secondary mirror separately.

As a fifth modification, it is not always necessary that the arrangement direction of the liquid crystal elements of the projector 10 corresponds to the vertical direction VD and horizontal direction HD of the image. That is, an oblique direction with respect to the arrangement direction of the liquid crystal elements of the projector 10 may correspond to the vertical direction VD or horizontal direction HD of the image.

What is claimed is:

1. A head-up display device that is to be mounted in an instrument panel of a vehicle and to virtually display an image to be viewable by an occupant by projecting the image on a projection member located above the instrument panel in a vehicle upward direction, and in which a direction along an up-down direction of the vehicle when the image is virtually displayed is defined as a vertical direction of the image, the head-up display device comprising:
   a projector that projects an image as a light polarized in a polarization direction intersecting the vertical direction of the image;
   a reflecting mirror that is disposed on an optical path between the projector and the projection member to reflect and redirect the light of the image from the projector toward the projection member, and has a difference between S polarization reflectance and P polarization reflectance for the light from the projector; and
   a concave mirror that is disposed on the optical path between the reflecting mirror and the projection member to reflect and redirect the light of the image reflected by the reflecting mirror toward the projection member, wherein a direction along a left-right direction of the vehicle when the image is virtually displayed is defined as a horizontal direction of the image, the reflecting mirror reflects and redirects the light of the image in the horizontal direction of the image, the concave mirror reflects and redirects the light of the image reflected by the reflecting mirror in the vertical direction of the image, the reflecting mirror includes
- a retardation plate disposed at a front side of the reflecting mirror, the front side facing the projector and the concave mirror, and
- a dielectric multilayer film stacked on a back side of the retardation plate opposite to the projector and the concave mirror with respect to the retardation plate, and the dielectric multilayer film has the S polarization reflectance higher than the P polarization reflectance, and
- the retardation plate and the dielectric multilayer film are stacked such that (i) the retardation plate allows the light of the image projected from the projector and reaching the retardation plate as a light of P polarization to travel through the retardation plate to the dielectric multilayer film while converting into S polarized light; the dielectric multilayer film reflects and introduces the converted S polarized light travelled through the retardation plate into the retardation plate; and the retardation plate allows the S polarization light reflected from the dielectric multilayer film to travel through the retardation plate while converting into P polarized light and allows the reconverted P polarized light to be emitted toward the concave mirror, and (ii) the retardation plate allows S polarization components of an external light to travel through the retardation plate toward the dielectric multilayer film while converting into P polarization components, the external light reflected by the concave mirror and reaching the retardation plate containing the S polarization components more than P polarization components; and the dielectric multilayer film allows the converted P polarization components of the external light from the retardation plate to travel through the dielectric multilayer film and to be emitted from a back side of the dielectric multilayer film.

2. The head-up display device according to claim 1, wherein
the reflecting mirror redirects the light of the image in the vertical direction of the image, and the S polarization reflectance is higher than the P polarization reflectance.

3. The head-up display device according to claim 1, wherein
the dielectric multilayer film has a reflection characteristic in which infrared light reflectance is lower than visible light reflectance.

4. The head-up display device according to claim 1, wherein
the reflecting mirror has a convex mirror shape.

5. The head-up display device according to claim 1, wherein
the difference between the S polarization reflectance and the P polarization reflectance is 5% or more.

6. The head-up display device according to claim 1, wherein
the polarization direction is a direction that forms an angle of 45° or more with respect to the vertical direction of the image.

7. A head-up display device that is to be mounted in an instrument panel of a vehicle and to virtually display an image to be viewable by an occupant by projecting the image on a projection member located above the instrument panel in a vehicle upward direction, and in which a direction along an up-down direction of the vehicle when the image is virtually displayed is defined as a vertical direction of the image, the head-up display device comprising:
- a projector that projects an image as a visible light polarized in a polarization direction intersecting the vertical direction of the image;
- a reflecting mirror that is disposed on an optical path between the projector and the projection member to reflect and redirect the visible light of the image from the projector toward the projection member, and has a difference between S polarization reflectance and P polarization reflectance for the visible light from the projector; and
- a concave mirror that is disposed on the optical path between the reflecting mirror and the projection member to reflect and redirect the visible light of the image reflected by the reflecting mirror toward the projection member, wherein the reflecting mirror reflects and redirects the visible light of the image in the vertical direction of the image, the reflecting mirror includes a dielectric multilayer film that has a plurality of dielectrics stacked in a normal direction of a front surface of the reflecting mirror;

the dielectric multilayer film has the S polarization reflectance higher than the P polarization reflectance, and defines the front surface of the reflecting mirror facing the projector and the concave mirror, and the reflecting mirror and the concave mirror are configured such that (i) the dielectric multilayer film allows the visible light of the image projected from the projector and reaching the dielectric multilayer film as a visible light of S polarization to reflect and redirect toward the concave mirror, and (ii) the concave mirror reflects a visible light of an external light toward the reflecting mirror to have P polarization components more than S polarization components, and the dielectric multilayer film allows the P polarization components of the visible light of the external light reflected by the concave mirror to travel through the dielectric multilayer film and to be emitted from a back side of the dielectric multilayer film.

8. The head-up display device according to claim 7, wherein
the dielectric multilayer film has a reflection characteristic in which infrared light reflectance is lower than visible light reflectance.

9. The head-up display device according to claim 7, wherein
the reflecting mirror has a convex mirror shape.

10. The head-up display device according to claim 7, wherein
the difference between the S polarization reflectance and the P polarization reflectance is 5% or more.

11. The head-up display device according to claim 7, wherein
the polarization direction is a direction that forms an angle of 45° or more with respect to the vertical direction of the image.

12. The head-up display device according to claim 7, wherein
    the dielectric multilayer film defines a front surface of the reflecting mirror facing the projector and the concave mirror.
13. The head-up display device according to claim 7, wherein
    the reflecting mirror further includes a light-transmissive plate disposed on the back side of the dielectric multilayer film.
14. The head-up display device according to claim 13, wherein
    the P polarization components of the visible light of the external light reflected by the concave mirror travel through the dielectric multilayer film and further through the light-transmissive plate.

* * * * *